United States Patent
Walsh et al.

(10) Patent No.: US 11,764,603 B2
(45) Date of Patent: Sep. 19, 2023

(54) SMART CIRCUIT BREAKER, SYSTEM INCLUDING THE SAME, AND METHOD OF MANAGING POWER

(71) Applicant: EATON INTELLIGENT POWER LIMITED, Dublin (IE)

(72) Inventors: Patrick T. Walsh, Coraopolis, PA (US); Todd F. Lottmann, Moon Township, PA (US); Lanson D. Relyea, Moon Township, PA (US); Ryan F. Brager, Maple Grove, MN (US); Kaytee Johnson, Leetsdale, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/173,322

(22) Filed: Feb. 11, 2021

(65) Prior Publication Data

US 2022/0255344 A1 Aug. 11, 2022

(51) Int. Cl.
  *H02J 9/08* (2006.01)
  *H02J 9/06* (2006.01)
  *H01H 83/20* (2006.01)
  *H02H 1/00* (2006.01)

(52) U.S. Cl.
  CPC .............. *H02J 9/061* (2013.01); *H01H 83/20* (2013.01); *H02H 1/0007* (2013.01); *H02J 9/068* (2020.01); *H01H 2300/018* (2013.01)

(58) Field of Classification Search
  None
  See application file for complete search history.

(56) References Cited

U.S. PATENT DOCUMENTS

| | | | |
|---|---|---|---|
| 6,104,586 A | 8/2000 | Robinson | |
| 6,198,176 B1* | 3/2001 | Gillette | H02J 9/08 307/64 |
| 10,819,140 B1* | 10/2020 | Maalouf | H02J 13/00 |
| 2006/0138868 A1 | 6/2006 | Wareham et al. | |
| 2020/0169050 A1 | 5/2020 | Walsh et al. | |
| 2020/0177092 A1* | 6/2020 | Ledezma | H02P 27/08 |
| 2021/0006073 A1* | 1/2021 | Donahue | H02J 13/00006 |
| 2021/0028648 A1* | 1/2021 | Gamroth | H02J 9/061 |

OTHER PUBLICATIONS

ConnectDER; "Products", http://connectder.com/products/, Nov. 27, 2018, pp. 1-9.

* cited by examiner

*Primary Examiner* — Jared Fureman
*Assistant Examiner* — Esayas G Yeshaw
(74) *Attorney, Agent, or Firm* — Eckert Seamans Cherin & Mellott, LLC

(57) ABSTRACT

A smart circuit breaker includes a communication interface, separable contacts, a processing unit having a memory with a routine stored therein which, when executed by the processing unit causes the processing unit to: sense a power outage in an electrical grid, control a meter to open contacts to disconnect from the electrical grid, sense power restoration to the electrical grid, control contacts corresponding to a secondary power source to open, control the meter to close contacts to reconnect to the electrical grid, sense that a frequency of power from the electrical grid matches a frequency of power from the secondary power source, and control the contacts corresponding to the secondary power source to close.

20 Claims, 7 Drawing Sheets

SMART CIRCUIT BREAKER, SYSTEM INCLUDING THE SAME, AND METHOD OF MANAGING POWER

BACKGROUND

Field

The disclosed concept relates generally to power management, and more particularly, to smart circuit breakers. The disclosed concept also relates to systems and methods for power management.

Background Information

Many homes use secondary power sources such as solar power. Solar power can effectively reduce a residential or commercial customer's usage of utility power. In many cases, the customer can also sell excess power to the utility and feed the excess power to the electrical grid.

Without secondary power sources, utility power would generally only flow to the customer. With secondary power sources, utility power can flow to the customer, but power from the secondary power source can also be fed to the electrical grid. Secondary power sources are generally selected to meet the particular customer's power needs and are not sufficient to provide power multiple customers. Excess power is often the result of the secondary power source generating power at a time when the customer does not need the power. For example, solar power may generate power during the day when the customer's demand for power is low.

With the possibility of secondary power sources feeding power to the electrical grid, but not being sufficient to provide power to multiple customers, it is desirable to control the flow of power from the secondary power source to the electrical grid, and especially so during a power outage. Power outages and restoration of power also introduce issues such as preserving power usage during the outage and the strain caused to the electrical grid when power is restored.

However, there is room for improvement in devices that manage power, systems including the same, and methods of managing power.

SUMMARY

These needs and others are met by embodiments of the disclosed concept, which are directed to a smart circuit breakers, systems including the same, and method of managing power.

In accordance with aspects of the disclosed concept, a smart circuit breaker comprises: a communication interface; separable contacts; a processing unit having a memory with a routine stored therein which, when executed by the processing unit causes the processing unit to: sense a power outage in an electrical grid; control a meter to open contacts to disconnect from the electrical grid; sense power restoration to the electrical grid; control contacts corresponding to a secondary power source to open; control the meter to close contacts to reconnect to the electrical grid; sense that a frequency of power from the electrical grid matches a frequency of power from the secondary power source; and control the contacts corresponding to the secondary power source to close.

In accordance with another aspect of the disclosed concept, a method of managing power with a smart circuit breaker comprises: sensing a power outage in an electrical grid; controlling a meter to open contacts to disconnect from the electrical grid; sensing power restoration to the electrical grid; controlling contacts corresponding to a secondary power source to open; controlling the meter to close contacts to reconnect to the electrical grid; sensing that a frequency of power from the electrical grid matches a frequency of power from the secondary power source; and controlling the contacts corresponding to the secondary power source to close.

In accordance with another aspect of the disclosed concept, a system comprises: a secondary power source; a meter having contacts operable to electrically connect and disconnect from an electrical grid; and a smart circuit breaker comprising: a communication interface; separable contacts; a processing unit having a memory with a routine stored therein which, when executed by the processing unit causes the processing unit to: sense a power outage in the electrical grid; control the meter to open the contacts to disconnect from the electrical grid; sense power restoration to the electrical grid; control contacts corresponding to the secondary power source to open; control the meter to close contacts to reconnect to the electrical grid; sense that a frequency of power from the electrical grid matches a frequency of power from the secondary power source; and control the contacts corresponding to the secondary power source to close.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
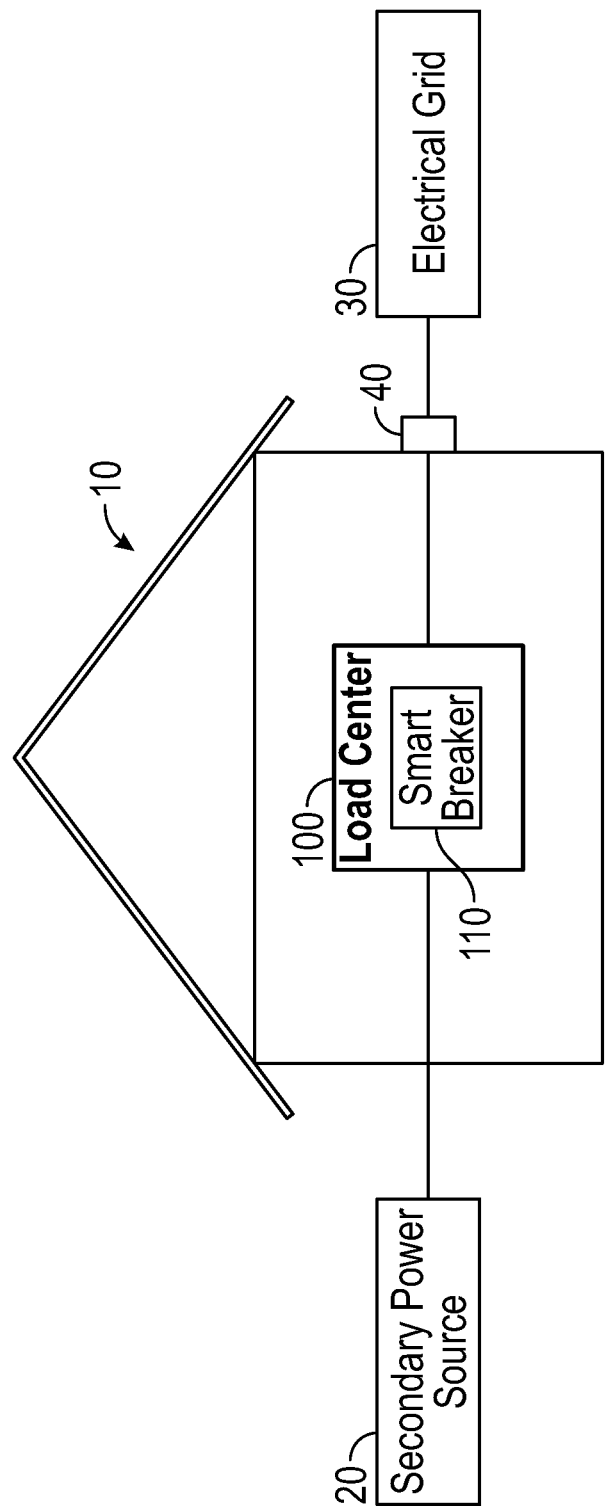
FIG. 1 is a schematic diagram of a power customer in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the term "processor" shall mean a programmable analog and/or digital device that can store, retrieve and process data; a controller; a control circuit; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "number" shall mean one or an integer greater than one (i.e., a plurality).

FIG. 1 is a schematic diagram of a power customer in accordance with an example embodiment of the disclosed concept. As shown in FIG. 1, a residence 10 (or commercial location) includes a secondary power source 20. The secondary power source 20 may be a solar panel, a geothermal power generator, a wind power generator, a hydro power generator, or any other suitable type of secondary power source. The residence 10 is also connected to the electrical grid 30 where it receives utility power. The utility power is received through a meter 40. In some example embodiments, the meter 40 is configured to meter power flowing from the electrical grid 30 to the residence as well as power flowing from the secondary power source 20 to the electrical grid 30.

Power from the electrical grid 30 and from the secondary power source 20 are received at a load center 100 at the residence 10. The load center 100 may be, for example and without limitation, a circuit breaker panel, and may include a number of circuit breakers connected to various branch circuits within the residence 10. The load center 100 includes at least one power management device such as a smart circuit breaker 110.

The smart circuit breaker 110 is electrically connected to the secondary power source 20. The smart circuit breaker 110 includes separable contacts that are structured to open to prevent power from flowing from the secondary power source 20 to the various branch circuits in the residence 10. The meter 40 also includes separable contacts that are structured to open to prevent power from flowing from the electrical grid 30 to the load center 100.

In some example embodiments of the disclosed concept, the meter 40 is structured to open its separable contacts in response to a power outage on the electrical grid 30. Opening the separable contacts prevent power from the secondary power source 20 from back feeding onto the electrical grid 30 during a power outage. During a power outage, various residences will often be without power and the power from the secondary power source 20 will be unable to supply sufficient power to the electrical grid 30 to power the various residences without power. Back feeding insufficient power to the electrical grid 30 is undesirable as the insufficient power could cause devices at the various residences to operate improperly and the demand could cause an excess strain on the secondary power source 20. Additionally, back feeding the power from the secondary power source 20 to the electrical grid 30 can prevent the residence 10 from using the power from the secondary power source 20 when it is most needed during the power outage. By opening the meter's 40 separable contacts during a power outage, the residence 10 can use the power from the secondary power source 20 without having it back fed to the electrical grid 30.

Once power on the electrical grid 30 is restored, the smart circuit breaker 110 is structured to open its separable contacts to prevent power from the secondary power source 20 from flowing to the various branch circuits in the residence 10. Additionally, once power on the electrical grid 30 is restored, the meter 40 is structured to close its separable contacts to allow power to flow from the electrical grid 30 to the load center 100. The smart circuit breaker 110 is structured to sense the power flowing from the electrical grid 30 and to sense when the frequency of the power from the electrical grid 30 matches the frequency from the secondary power source 20. Once the frequencies are matched, the smart circuit breaker 110 is structured to close its separable contacts to allow power from the secondary power source 20 to flow to the various branch circuits in the residence 10 or to be fed to the electrical grid 30. During power restoration after a power outage, there will be a period of time when the frequency of the power from the electrical grid 30 does not match the frequency of the power from the secondary power source 20 and it would be undesirable to supply the various branch circuits in the residence 10 with power having unmatched frequencies.

The separable contacts of the meter 40 may be caused to open or close in various ways. In some example embodiments of the disclosed concept, the meter 40 itself will sense the power outage or power restoration and control the separable contacts to open and close. In some other example embodiments of the disclosed concept, an external component, such as the smart circuit breaker 110 or a control center of the utility will sense the power outage or power restoration and communicate with the meter 40 and instruct it to open or close its separable contacts.

In some example embodiments of the disclosed concept, the smart circuit breaker 110 may have various capabilities such as metering and communication capabilities. The smart circuit breaker 110 may meter power flowing through it, such as power flowing from the secondary power source 20 or to and from various loads connected to the load center 100. It will be appreciated that multiple smart circuit breakers 110 may be disposed in the load center 100. In some example embodiments of the disclosed concept, the smart circuit breaker 110 may be structured to communicate with other smart circuit breakers 110 and other devices. For example, the smart circuit breaker 110 may communicate data, such as metering data, and may send and receive commands, such as sending commands to the meter 40 to open its separable contacts or receive commands from other devices to open or close its own contacts.

It will also be appreciated that in some example embodiments of the disclosed concept, the meter 40 may include a smart circuit breaker 110 as well. Furthermore, while FIG. 1 depicts a single power customer, the disclosed concept may also be applicable across multiple power customers.

Figure 2:
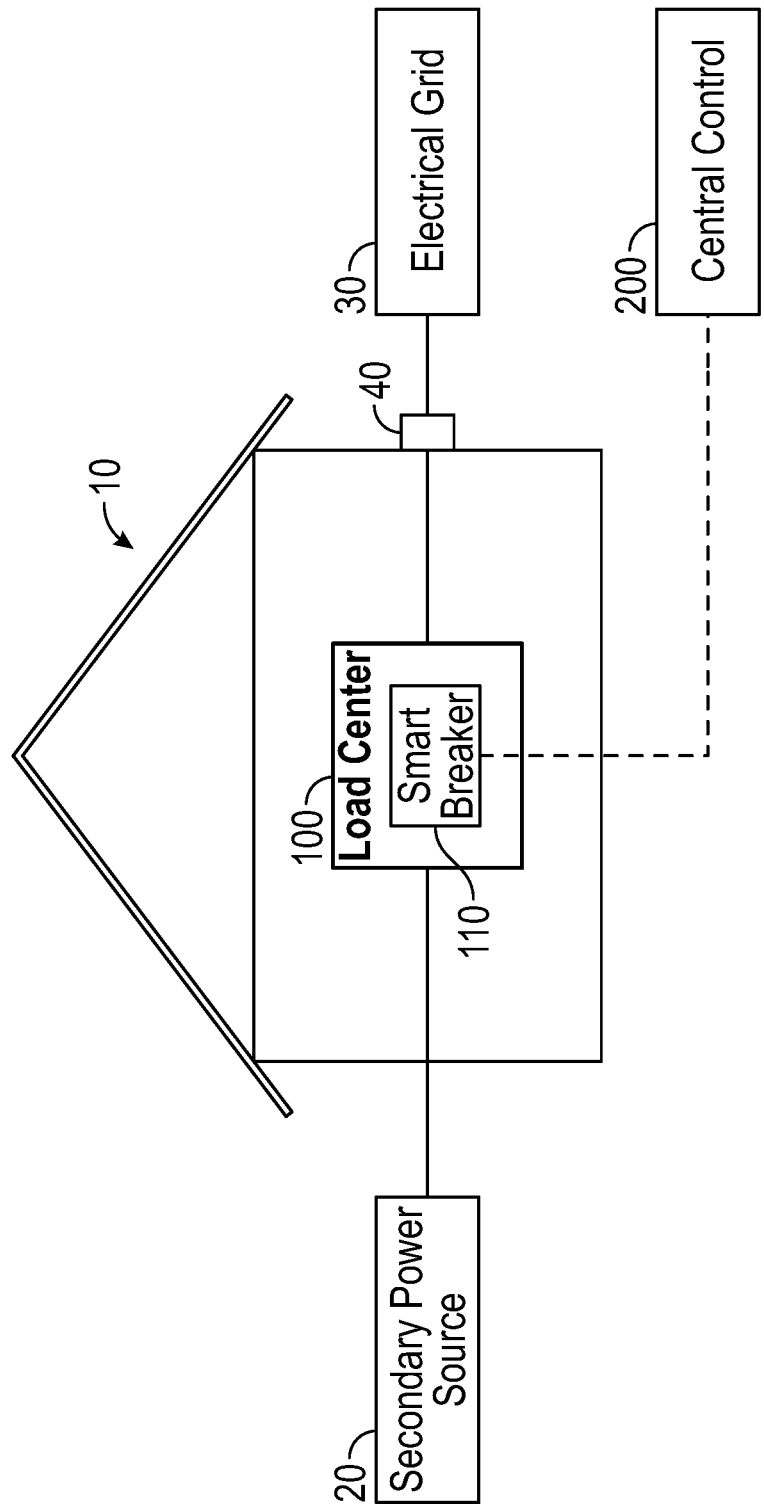
FIG. 2 is a schematic diagram of a power customer in accordance with another example embodiment of the disclosed concept.

FIG. 2 is a schematic diagram of a power customer in accordance with another example embodiment of the disclosed concept. The architecture in FIG. 2 is similar to the architecture in FIG. 1. However, in FIG. 2, a central control 200 is also shown. The central control 200 may be, for example and without limitation, a control center at a utility, or other centralized control system. In some example embodiments of the disclosed concept, the smart circuit breaker 110 is structured to communicate with the central control 200 and vice versa. The smart circuit breaker 110 may communicate with the central control 200 via any suitable wired or wireless communication scheme. For example, the smart circuit breaker 110 may be structured to communicate with the central control 200 via the internet. The smart circuit breaker 110 may communicate data, such as metering data, to the central control 200 or other devices.

The smart circuit breaker 110 may also receive commands from the central control 200, such as a command to open or close its contacts or control the meter 40 to open or close its contacts. This communication and command functionality may be utilized, for example, to stagger reconnection to the electrical grid 30 when power is restored. Such commands may also be utilized to communicate and/or command load shedding. For example, the power customer may be incentivized to reduce its load during peak demand periods. The central control 200 may communicate such peak demand periods to the smart circuit breaker 110 and the smart circuit breaker 110 may adjust load management, for example shedding some loads, to take advantage of the inventive.

Figure 3:
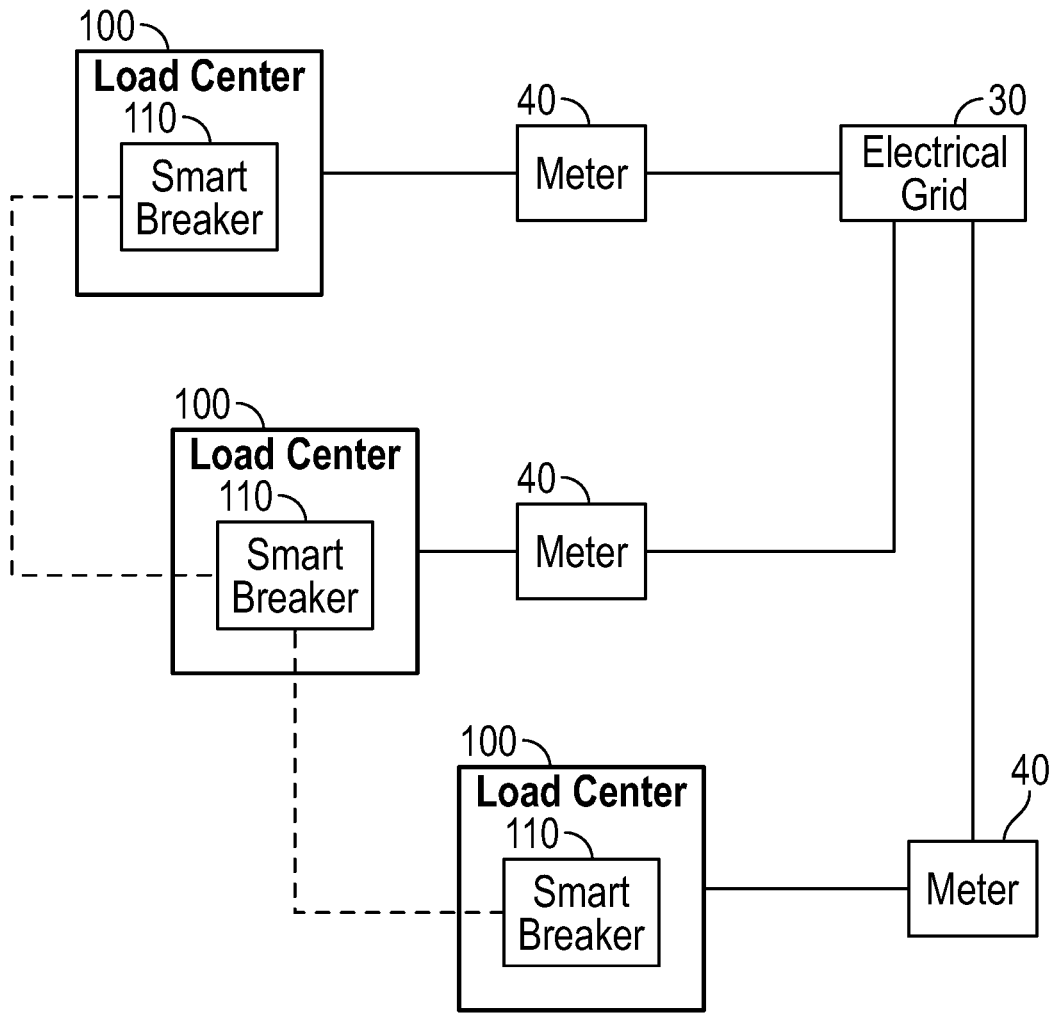
FIG. 3 is a schematic diagram of a multiple power customers in accordance with another example embodiment of the disclosed concept.

FIG. 3 is a schematic diagram of multiple power customers in accordance with an example embodiment of the disclosed concept. Each power customer may be similar to those shown in FIG. 1. While a secondary power source is not shown in FIG. 3, it will be appreciated that one or more of the power customers may have a secondary power source. In the example embodiment of FIG. 3, the smart circuit breakers 110 of the various power customer may be structured to communicate with each other. This communication may be used to facilitate, for example, staggering of each power customer reconnecting to the electrical grid 30 upon restoration of power so as to avoid simultaneous reconnection of all power customers which may strain the electrical grid. Some example of reconnection schemes will be described in more detail with respect to FIGS. 7 and 8.

Figure 4:
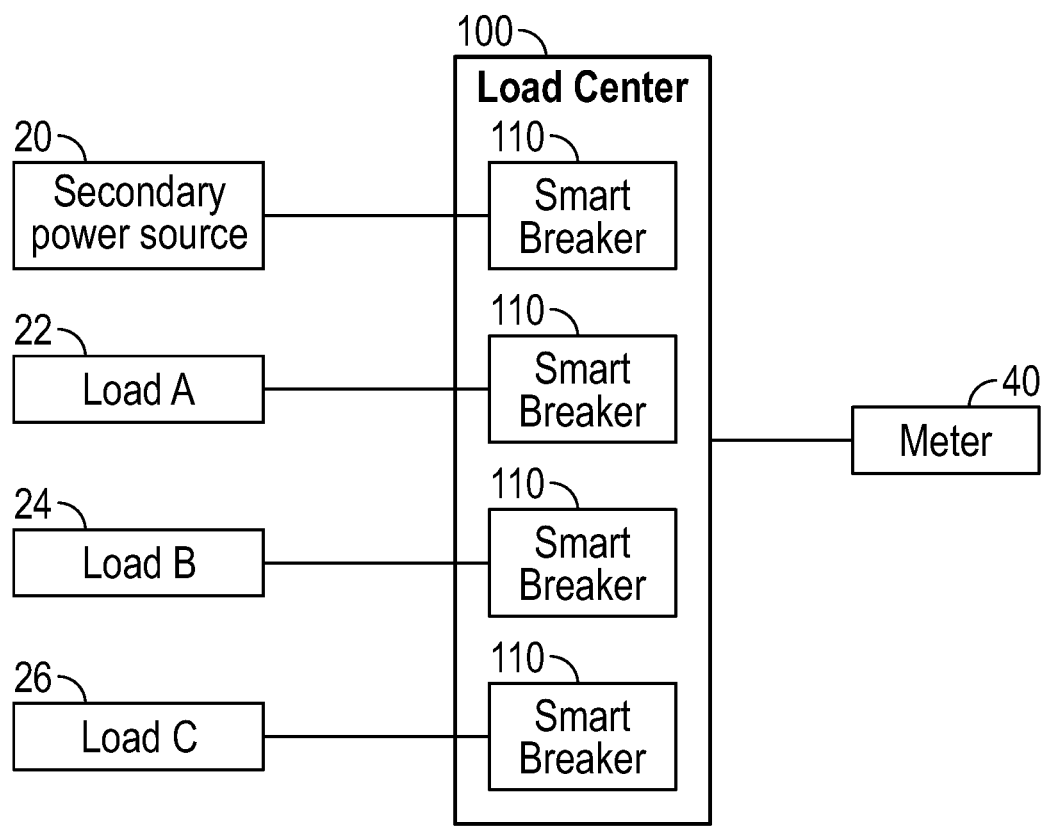
FIG. 4 is a schematic diagram of a power customer in accordance with another example embodiment of the disclosed concept.

FIG. 4 is a schematic diagram of a power customer in accordance with another example embodiment of the disclosed concept. In the example shown in FIG. 4, the load center 100 includes multiple smart circuit breakers 110. The smart circuit breakers 110 may each corresponding to a secondary power source 20 or various loads 22,24,26. The smart circuit breakers 110 may be structured to implement a load management scheme by opening and closing their contacts to permit or deny their corresponding power sources or loads to draw or supply power. For example, during an outage, the smart circuit breakers 110 may develop and implement a load management scheme, such as a scheme to shed low priority loads by opening contacts corresponding to those loads in order to preserve the limited power capacity of the secondary power source 20.

Figure 5:
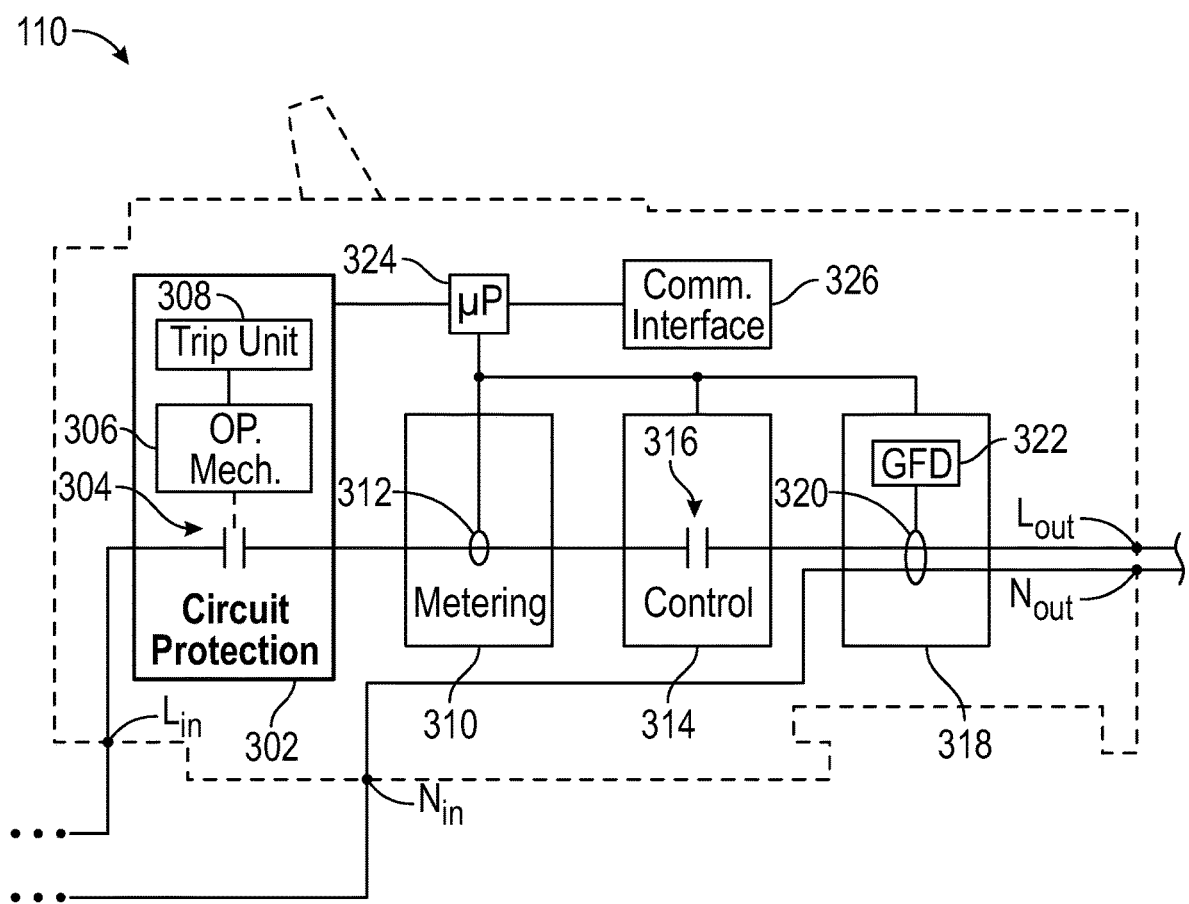
FIG. 5 is a schematic diagram of a smart circuit breaker in accordance with an example embodiment of the disclosed concept.

FIG. 5 is a schematic diagram of a smart circuit breaker 110 shown in more detail in accordance with an example embodiment of the disclosed concept.

In an example embodiment, the smart circuit breaker 110 includes circuit protection circuitry 302. The circuit protection circuitry 302 may include first separable contacts 304, an operating mechanism 306, and a trip unit 308. The circuit protection circuitry 302 is structured to detect a fault (e.g., without limitation, overcurrent, arc fault, etc.) by monitoring power flowing through the smart circuit breaker 110 and trip open the first separable contacts 304 in response to detecting the fault. For example, in some embodiments, the circuit protection circuitry 302 includes the trip unit 308 structured to receive information on the power flowing through the smart circuit breaker 110 via one or more sensors (not shown). Based on the received information, the trip unit 308 determines whether a fault is detected. In response to detecting a fault, the trip unit 308 outputs a trip signal to the operating mechanism 306. The operating mechanism 306 is structured to open and close the first separable contacts 304. In response to receiving the trip signal, the operating mechanism 306 is structured to trip open the first separable contacts 304. Although an example of circuit protection circuitry 302 has been described herein, it will be appreciated by those having ordinary skill in the art that other types of circuit protection circuitry may be employed without departing from the scope of the disclosed concept. For example and without limitation, in some embodiments the circuit protection circuitry 302 may include a thermal/magnetic trip mechanism structured to trip open in response to predetermined fault conditions.

The smart circuit breaker 110 may also include metering circuitry 310 which is capable of metering power passing through the smart circuit breaker 110. The metering circuitry 310 may include one or more sensors such as a current sensor 312 used to sense the current of power flowing through the smart circuit breaker 110. The metering circuitry 310 may also include other type of sensors such as, without limitation, a voltage sensor (not shown).

The smart circuit breaker 110 may further include control circuitry 314. The control circuitry 314 may include second separable contacts 316. The second separable contacts 316 may be controlled to open or close regardless of whether a fault condition exists. For example and without limitation, the second separable contacts 316 may be opened to cause the smart circuit breaker 110 to stop power from flowing from the secondary power source 20 (see FIG. 1) to the electrical grid 30. The control circuitry may include a second operating mechanism (not shown) such as a solenoid to open and close the second separable contacts 316.

The smart circuit breaker 300 may additionally include ground fault detection circuitry 318. The ground fault detection circuitry 318 may include a ground fault coil 320 and a ground fault detector 322. The ground fault detection circuitry 318 is structured to sense current flowing through line and neutral conductors in the smart circuit breaker 110 and the ground fault detector 322 is structured to determine whether a ground fault is present based on the detected currents. In response to detecting a ground fault, the ground fault detector 322 may output a ground fault signal. The smart circuit breaker 110 may cause the first or second separable contacts 304,316 is response to the ground fault being detected.

A communication interface 326 may also be provided in the smart circuit breaker 110. The communication interface 326 provides communication functionality which allows the smart circuit breaker 110 to communicate with other devices such as other smart circuit breakers 110, other devices on the electrical grid 30 or within the residence 10, a control center, or any other compatible device. The communication interface 326 may provide functionality for wired or wireless communication using any suitable wired or wireless communication protocols.

A processing unit 324 is also provided in the smart circuit breaker 110. The processing unit 324 may include a processor and an associated memory. The processor may be, for example and without limitation, a microprocessor, a microcontroller, or some other suitable processing device or circuitry. The memory may be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. In some embodiments of the disclosed concept, one or more routines that may be executed by the processor may be stored in the memory of the processing unit 324.

The processing unit 324 may control the various components in the smart circuit breaker 300. Routines stored in the processing unit 324 which, when executed by the processing unit 324, cause the smart circuit breaker 110 to implement various functionality.

Figure 6:
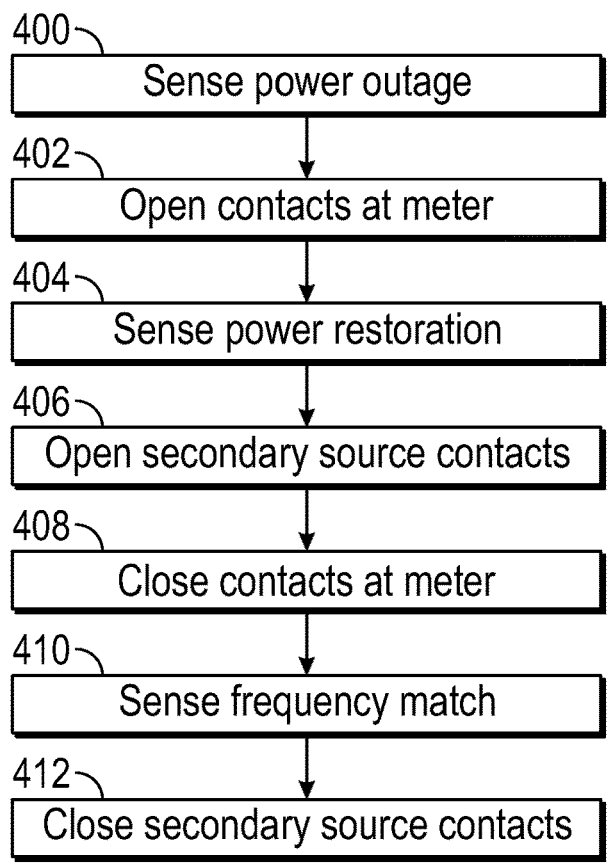
FIG. 6 is a flowchart of a method of islanding and reconnecting in accordance with an example embodiment of the disclosed concept.

FIG. 6 is a flowchart of a method of islanding and reconnecting to the electrical grid in accordance with an example embodiment of the disclosed concept. The method may be stored as a routine in the processing unit 324, for example. The method begins at 400 when a power outage is detected. The power outage may be detected by the smart circuit breaker 110 in an example embodiment. The power outage may be detected by a metering function of the smart circuit breaker 110. In some example embodiments, the power outage may be communicated to the smart circuit breaker 110 from another device, such as the meter 40 or the utility. At 402, the smart circuit breaker 110 controls the meter 40 to open its separable contacts to disconnect the power customer from the electrical grid 30. In embodiments where the smart circuit breaker 110 functions as the meter 40, the smart circuit breaker 110 may control its own contacts to open. When the contacts are opened, the power customer is disconnected from the electrical grid 30, thus preventing power from a secondary power source 20 from flowing onto the electrical grid 30.

At 404, the smart circuit breaker 110 sense power has been restored. At 406, the smart circuit breaker 110 controls contacts corresponding to the secondary power source 20 to open. At 408, the smart circuit breaker 110 controls the meter 40 to close its contacts, thus reconnecting the power customer to the electrical grid 30. Then, at 410, the smart circuit breaker 110 senses when the frequency of power from the electrical grid 30 matches the frequency of power from the secondary power source 20. When the frequencies match, the smart circuit breaker 110 controls the contacts corresponding to the secondary power source 20 to close at 412. In this manner, the various loads connected to the load center 100 are prevented from being supplied with power having mismatched frequencies.

Figure 7:
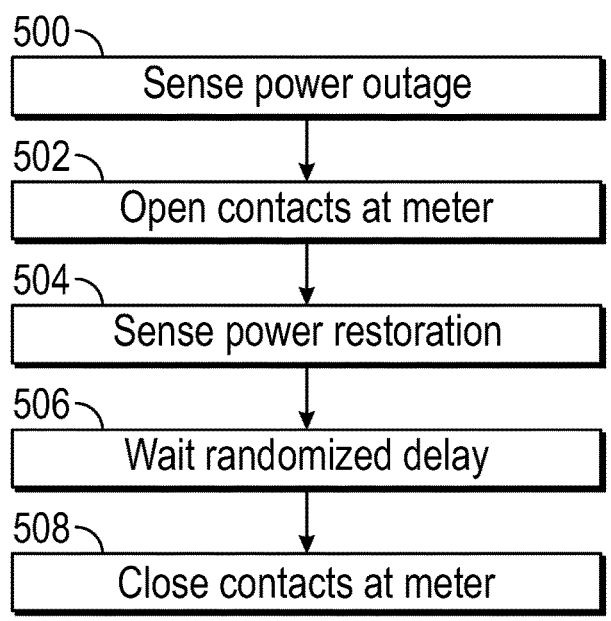
FIG. 7 is a flowchart of a method of randomizing reconnection in accordance with an example embodiment of the disclosed concept.

FIG. 7 is a flowchart of a method of randomizing reconnection to the electrical grid 30 in accordance with another example embodiment of the disclosed concept. The method may be stored as a routine in the processing unit 324 of the smart circuit breaker 110, for example.

When power is restored to an area after a power outage, the customers in the area will have their power restored substantially simultaneously. The instantaneous load drawn when power is restored could potentially have an adverse effect on the electrical grid 30. In this example embodiment, the smart circuit breaker 110 may add a random delay before reclosing and allowing power from the electrical grid 30 to flow to the power customer. When this effect is aggregated over many smart circuit breakers 110 in an area, they will reclose in a random staggered manner smoothing out the instantaneous demand on the electrical grid.

The method begins at 500 with sensing a power outage, similar to the method of FIG. 6, and proceeds to 502 where the smart circuit breaker 110 controls the meter 40 to open its contacts, also similar to the method of FIG. 6. Similarly, the method then proceeds to 504, where the smart circuit breaker 110 senses that power has been restored. At 506, the smart circuit breaker 110 waits a randomized delay time before proceeding to 508 where the smart circuit breaker 110 controls the meter 40 to close its contacts to reconnect the power customer to the electrical grid 30. With this method, the smart circuit breaker 110 does not need to communicate with other smart circuit breakers 110. When power customers in an area have similar smart circuit breakers 110 their individual randomized delay before reconnecting to the electrical grid 30 will stagger their reconnections and smooth the instantaneous strain on the electrical grid 30.

Figure 8:
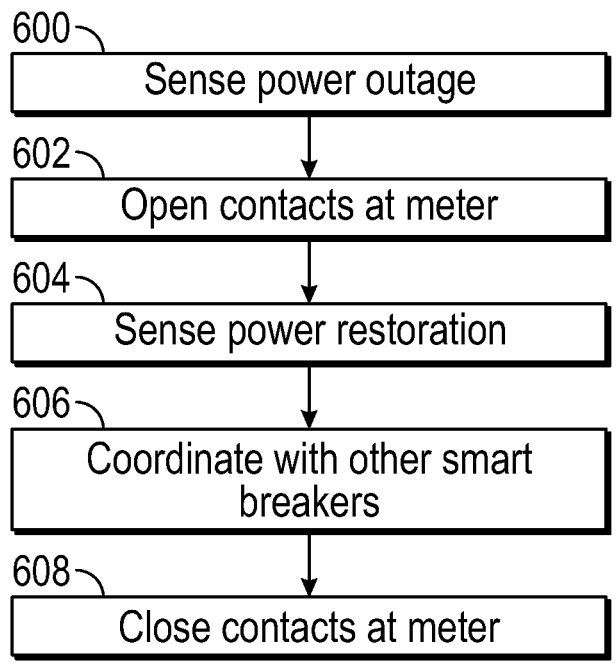
FIG. 8 is a flowchart of a method of coordinating reconnection in accordance with an example embodiment of the disclosed concept.

FIG. 8 is a flowchart of a method of coordinating reconnection to the electrical grid 30 in accordance with another example embodiment of the disclosed concept. The method begins with sensing a power outage at 600, controlling the meter 40 to open its contacts at 602, and sensing restoration of power at 604, similar to the method of FIG. 6. However, the method of FIG. 7 utilized communication between smart circuit breakers 110 to coordinate reconnection to the electrical grid 30 among different power customers.

At 606, the smart circuit breaker 110 coordinates with other smart circuit breakers 110. This coordination involves communication between the smart circuit breaker 110 and other smart circuit breakers 110 or a centralized control system. For example, the smart circuit breakers 110 in an area may communicate with each other to develop a scheme to coordinate reconnection to the electrical grid 30. This scheme may include staggering reconnections so that all of the customers do not simultaneously reconnect. The scheme may, for example, include developing a priority list of power customers and reconnecting higher priority power customers first. The priority may be predetermined or it may be based on data collected by the smart circuit breakers 110. For example, the smart circuit breakers 110 may use metering data to prioritize reconnection of power customers that have historically high power demands at the time power is restored. High power demands may be indicative that a power customer is operating, in the case of a commercial customer, or at home in the case of the residential customer. A low power demand may be indicative that the power customer is closed or not at home at that time, historically, and would be lower priority to reconnect.

While a prioritized list is one example of a reconnection scheme, other schemes may also be employed without departing from the scope of the disclosed concept. For example, the order of reconnection may be random and staggered such that only a predetermined number of power customers reconnect during a specified time period. Another example is that power customers may be incentivized to delay reconnection. For example, power customers may receive discounts or other incentives to delay their reconnection while other power customers may pay a premium to prioritize their reconnection. While these are just some example of schemes to coordinate reconnection to the electrical grid 30, it will be appreciate that other schemes may be employed without departing from the scope of the disclosed concept. Once the smart circuit breakers 110 have coordinated their reconnection to the electrical grid 30, the method proceeds to 608 where the smart circuit breaker 110 controls the meter 40 to close its contacts at the time specified by the reconnection scheme.

Figure 9:
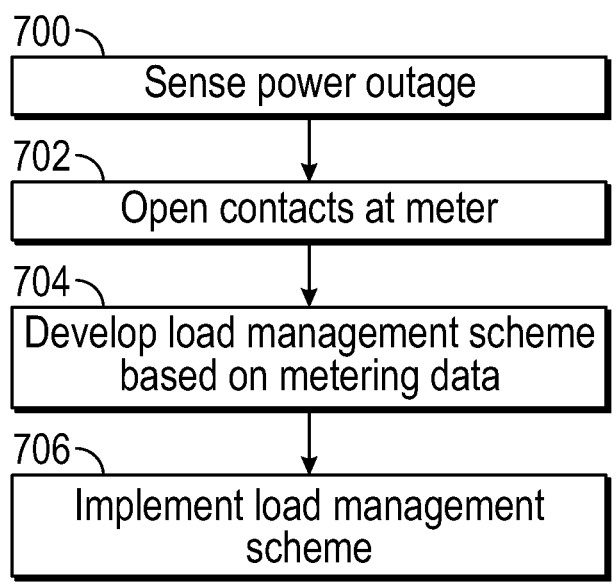
FIG. 9 is a flowchart of a method of load management during a power outage in accordance with an example embodiment of the disclosed concept.

FIG. 9 is a flowchart of a method of load management during a power outage in accordance with an example embodiment of the disclosed concept. The method may be stored as a routine in the processing unit 324 of the smart circuit breaker 110, for example.

The method may be implemented by one or more smart circuit breakers 110, such as in the system shown in FIG. 4. During a power outage, there may be a limited supply of power that a secondary power source 20 is capable of providing. In order not to strain or overwhelm the secondary power source 20, loads may need to be prioritized and lower priority loads may need to be disconnected. For example, loads such as a climate control system or certain appliances such as a refrigerator should be prioritized, while other loads such as a washer and dryer should be a lower priority if the power capacity during the outage is an issue.

The method begins at 700 with sensing a power outage. The method continues at 702 with the smart circuit breaker 110 controlling the meter 40 to open its contacts. At this point, the power customer will be relying on the secondary power source 20 for its power needs. At 704, the smart circuit breakers 110 develop a load management scheme. The load management scheme may be based in part on historical metering data collected by the smart circuit breakers 110. The historical metering data may be indicative of the power capacity of the secondary power source 20 and the power needs of various loads connected to the load center 100. The smart circuit breakers 110 may have a predetermined priority list of the loads connected to the load center 100. In an example embodiment, the load management scheme will compare the power capacity of the secondary power source 20 to the power demands of the loads. If the power capacity is insufficient, the smart circuit breakers 110 may develop a load management scheme in which lower priority loads are shed so that the power capacity of the secondary power source 20 is not strained. The load management scheme may be broad or granular without departing from the scope of the disclosed concept. For example, a broad scheme may shed groups of lower priority loads while a more granular scheme may individually shed loads to closely match the power capacity to the power demands.

Once a load management scheme is developed, the method proceeds to 706 where the load management scheme is implemented. The load management scheme may be implemented by one or more of the smart circuit breakers 110 opening contacts to stop their corresponding loads from drawing power. In an example embodiment, one smart circuit breaker 110 may be designated as the lead and command other smart circuit breakers 110 to open and close their contacts. However, it will be appreciated that in some example embodiments, the scheme may be distributed and each smart circuit breaker 110 may make the decision to open or close its own contacts based on the load management scheme.

While FIGS. 6-9 illustrate different functionalities of the smart circuit breakers 110, it will be appreciated that the smart circuit breakers 110 may implement combinations of the functionalities without departing from the scope of the disclosed concept. For example, a smart circuit breaker 110 may implement the islanding described with respect to FIG. 6 while also implementing the randomized reclosing described with respect to FIG. 7. Similarly, the same smart circuit breaker 110 may also implement the load management described with respect to FIG. 9. It will be appreciated that the various functionalities may be combined and/or modified without departing from the scope of the disclosed concept.

It will also be appreciated that the smart circuit breaker 110 may be implemented in any of the architectures shown in FIGS. 1-4, or in other types of architectures, without departing from the scope of the disclosed concept. It will also be appreciated that while an example of a smart circuit breaker 110 is shown in FIG. 5, the layout and components of the smart circuit breaker 110 may be modified without departing from the scope of the disclosed concept.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof

What is claimed is:

1. A smart circuit breaker comprising:
   a communication interface;
   separable contacts;
   a processing unit having a memory with a routine stored therein which, when executed by the processing unit causes the processing unit to:
   sense a power outage in an electrical grid;
   in response to sensing the power outage in the electrical grid, control a meter to open contacts to disconnect from the electrical grid;
   after controlling the meter to open contacts to disconnect from the electrical grid, sense power restoration to the electrical grid;
   in response to sensing power restoration to the electrical grid, control contacts corresponding to a secondary power source to open;
   in response to controlling contacts corresponding to the secondary power source to open, control the meter to close contacts to reconnect to the electrical grid;
   after controlling the meter to close contacts to reconnect to the electrical grid, sense that a frequency of power from the electrical grid matches a frequency of power from the secondary power source; and
   in response to sensing that the frequency of power from the electrical grid matches the frequency of power from the secondary power source, control the contacts corresponding to the secondary power source to close while contacts of the meter remain closed and connected to the electrical grid.

2. The smart circuit breaker of claim 1, wherein the routine when executed by the processing unit further causes the processing unit to:
   wait a randomized amount of time before controlling the meter to close contacts to reconnect to the electrical grid.

3. The smart circuit breaker of claim 1, wherein the routine when executed by the processing unit further causes the processing unit to:
   coordinate with other smart breakers to develop a reconnection scheme; and
   control the meter to close contacts to reconnect to the electrical grid at a time specified by the reconnection scheme.

4. The smart circuit breaker of claim 3, wherein the reconnection scheme includes a priority list of the smart circuit breaker and other smart circuit breakers, and wherein the time specified by the reconnection scheme is based on the priority list.

5. The smart circuit breaker of claim 3, wherein the reconnection scheme includes a randomized list of the smart circuit breaker and other smart circuit breakers, and wherein the time specified by the reconnection scheme is based on the randomized list.

6. The smart circuit breaker of claim 1, wherein the routine when executed by the processing unit further causes the processing unit to:
   develop a load management scheme based on data associated with the secondary power source and one or more loads; and
   implement the load management scheme by causing one or more loads to be disconnected.

7. The smart circuit breaker of claim 1, further comprising:
a metering unit structured to meter power flowing through the smart circuit breaker.

8. The smart circuit breaker of claim 1, wherein the separable contacts include:
first separable contacts structured to trip open in response to a fault; and
second separable contacts structured to selectively open and close.

9. The smart circuit breaker of claim 1, wherein the communication interface is structured to communicate with one or more external devices.

10. A method of managing power with a smart circuit breaker, the method comprising:
sensing a power outage in an electrical grid;
in response to sensing the power outage in the electrical grid, controlling a meter to open contacts to disconnect from the electrical grid;
after controlling the meter to open contacts to disconnect from the electrical grid, sensing power restoration to the electrical grid;
in response to sensing power restoration to the electrical grid, controlling contacts corresponding to a secondary power source to open;
in response to controlling contacts corresponding to the secondary power source to open, controlling the meter to close contacts to reconnect to the electrical grid;
after controlling the meter to close contacts to reconnect to the electrical grid, sensing that a frequency of power from the electrical grid matches a frequency of power from the secondary power source; and
in response to sensing that the frequency of power from the electrical grid matches the frequency of power from the secondary power source, controlling the contacts corresponding to the secondary power source to close, while contacts of the meter remain closed and connected to the electrical grid.

11. The method of claim 10, further comprising:
waiting a randomized amount of time before controlling the meter to close contacts to reconnect to the electrical grid.

12. The method of claim 10, further comprising:
coordinating with other smart breakers to develop a reconnection scheme; and
controlling the meter to close contacts to reconnect to the electrical grid at a time specified by the reconnection scheme.

13. The method of claim 12, wherein the reconnection scheme includes a priority list of the smart circuit breaker and other smart circuit breakers, and wherein the time specified by the reconnection scheme is based on the priority list.

14. The method of claim 12, wherein the reconnection scheme includes a randomized list of the smart circuit breaker and other smart circuit breakers, and wherein the time specified by the reconnection scheme is based on the randomized list.

15. The method of claim 10, further comprising:
developing a load management scheme based on data associated with the secondary power source and one or more loads; and
implementing the load management scheme by causing one or more loads to be disconnected.

16. A system comprising:
a secondary power source;
a meter having contacts operable to electrically connect and disconnect from an electrical grid; and
a smart circuit breaker comprising:
a communication interface;
separable contacts;
a processing unit having a memory with a routine stored therein which, when executed by the processing unit causes the processing unit to:
sense a power outage in the electrical grid;
in response to sensing the power outage in the electrical grid, control the meter to open the contacts to disconnect from the electrical grid;
after controlling the meter to open contacts to disconnect from the electrical grid, sense power restoration to the electrical grid;
in response to sensing power restoration to the electrical grid, control contacts corresponding to a secondary power source to open;
in response to controlling contacts corresponding to the secondary power source to open, control the meter to close the contacts to reconnect to the electrical grid;
after controlling the meter to close contacts to reconnect to the electrical grid, sense that a frequency of power from the electrical grid matches a frequency of power from the secondary power source; and
in response to sensing that the frequency of power from the electrical grid matches the frequency of power from the secondary power source, control the contacts corresponding to the secondary power source to close while contacts of the meter remain closed and connected to the electrical grid.

17. The system of claim 16, wherein the routine when executed by the processing unit further causes the processing unit to:
wait a randomized amount of time before controlling the meter to close contacts to reconnect to the electrical grid.

18. The system of claim 16, wherein the routine when executed by the processing unit further causes the processing unit to:
coordinate with other smart breakers to develop a reconnection scheme; and
control the meter to close contacts to reconnect to the electrical grid at a time specified by the reconnection scheme.

19. The system of claim 18, wherein the reconnection scheme includes a priority list of the smart circuit breaker and other smart circuit breakers, and wherein the time specified by the reconnection scheme is based on the priority list.

20. The system of claim 16, wherein the routine when executed by the processing unit further causes the processing unit to:
develop a load management scheme based on data associated with the secondary power source and one or more loads; and
implement the load management scheme by causing one or more loads to be disconnected.

* * * * *